June 11, 1946.     F. H. REICHEL ET AL     2,401,773
PROCESS OF FORMING A CASING FOR STUFFED PRODUCTS
Filed June 11, 1941
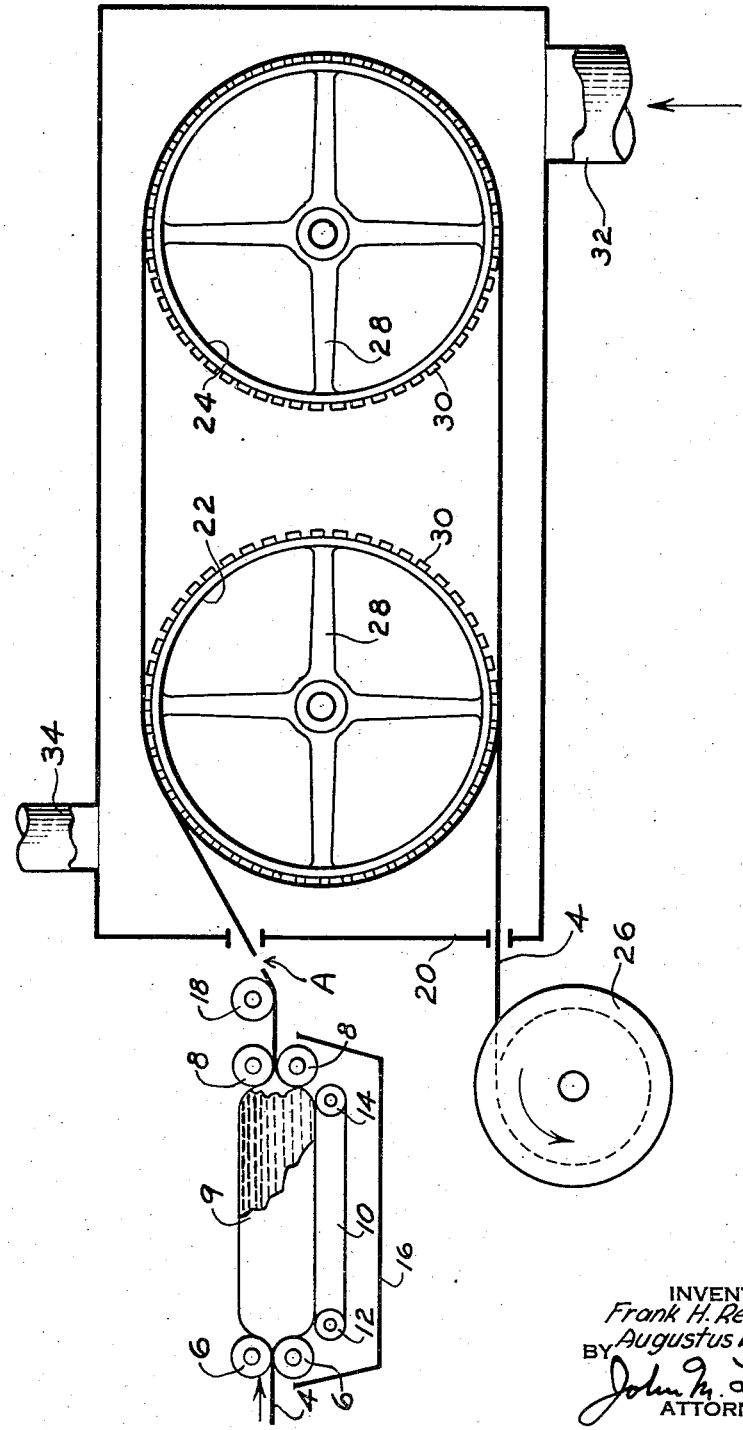
INVENTORS
*Frank H. Reichel*
*Augustus E. Craver*
BY
*John M. Leach*
ATTORNEY Patented June 11, 1946

2,401,773

UNITED STATES PATENT OFFICE 2,401,773

PROCESS OF FORMING CASINGS FOR STUFFED PRODUCTS

Frank H. Reichel and Augustus E. Craver, Fredericksburg, Va., assignors to Sylvania Industrial Corporation, Fredericksburg, Va., a corporation of Virginia Application June 11, 1941, Serial No. 397,552

12 Claims. (Cl. 99—176)

The present invention relates to a process for producing flexible tubing for use as a container for stuffed products, for example, sausage.

Artificial sausage casings as heretofore made of cellulose hydrate are characterized by shrinking a substantial amount while drying from a water-swollen condition to an air-dry condition whereby the casing adheres closely to the encased food product and maintains the food product in a compacted condition and thereby presents an attractive appearance at all times. In order to preserve the high shrinkage characteristics of such cellulose hydrate casings, it has been thought necessary heretofore to cause these casings to be stretched a substantial amount during stuffing by the stuffing pressure. The cellulose hydrate casings have, therefore, usually been furnished to meat packers in a dry, plasticized condition and having a size so selected as to cause the casing even after being soaked in a swelling liquid such as water, to have a swollen size considerably below the size to which the casing will be expanded during stuffing.

A conventional prior procedure to control the size of casings furnished to meat packers has been to dry the casings while inflated to a given diameter by air or some other suitable gas so that the casing would have a definite dry size. When such prior casings were received by the packer, he would wet them in water, and while in the wet condition, a casing would be slipped or shirred over the stuffing horn of a stuffing machine and the meat or other food product would be forced into the casing to fill and also to expand the casing to the size desired by the packer. The expansion of the casing to the desired size by the food product required relatively high pressure, which was conducive to fatigue on the part of the stuffing machine operator who was required to hold the casing tightly around the stuffing horn and against the pressure exerted by the food product. It was also necessary for the stuffer to exercise considerable skill while the casing was being expanded such a large amount to estimate when the casing was expanded to the proper size and to stuff the casing so that it was expanded to a substantially uniform size along its length. It was frequently impossible to obtain a uniform size along the length of the stuffed casing because of inevitable variations in the stuffing pressures due to manual control of the stuffing machine and because of slight variations in the wall strength of the casings being amplified in their effect by the high stuffing pressure. The above mentioned characteristics of prior casings greatly reduced the speed of production of the stuffed products. Moreover, the finished product was frequently unsightly because of variation in size and shape along the casing, particularly at the ends of the sausage or the like, in spite of all of the care that could be exercised by the machine operator, and considerable loss occasionally resulted due to bursting of the casings which had not been previously tested.

It is a general object of the present invention to provide a tubing, more particularly a sausage casing, which will overcome all of the foregoing difficulties.

Another general object is to provide a process of making tubing, more particularly sausage casing, which can be stuffed under a relatively low pressure.

A more specific object of the invention is to provide a tubing, more particularly a casing, for stuffed products which will require only a relatively slight expansion under the filling pressure during stuffing.

It is also an object of the present invention to provide a tubing, more particularly a casing, which has been tested prior to stuffing to a pressure in excess of the pressure which will be reached during stuffing.

It is another object of the present invention to provide a process for stuffing products in casings under a relatively low pressure.

It is a more specific object to provide a process of making a stuffed sausage utilizing a casing which can be stuffed under relatively low pressure and which will require relatively slight expansion during stuffing.

A further object of the invention is to provide an encased stuffed product, more particularly a stuffed sausage, the casing of which has been so treated that the product has square ends and is uniform in diameter throughout its length.

Other objects and advantages, if not specifically pointed out, will be apparent to those skilled in the art from the following detailed description of what are now considered the preferred embodiments of the invention.

The process of the present invention comprises, in general, expanding by application of an internal pressure, a tubing formed of a film-forming organic plastic material, in particular a film-forming cellulosic material, while in a wet state to a predetermined diameter at least equal to and preferably greater than the diameter to which the casing will be expanded later during stuffing by usual stuffing apparatus and in general accordance with usual stuffing operations. Thus by expanding the casing in the wet state to a diameter greater than that to which the casing will be expanded during stuffing, the casing will be tested during manufacture and decrease the possibility of failure during stuffing. After such expansion, the pressure is released and the tubing is suitably dried, for example, in a flat uninflated condition, and is then cut into the desired lengths for stuffing. When the lengths of the tubing are wet by the packer prior to stuffing, the tubing will assume a proper wet size relative to the size to which the casing will be expanded during stuffing to produce a compact well-shaped product. When the stuffing operator thereafter stuffs the food product into the casing, it will be necessary for the stuffing machine to exert only sufficient pressure to pack the food product firmly within the casing and expand the casing enough only to enable the elasticity of the casing to maintain the product in proper shape free from bulges and wrinkles. This slight pressure will also expand the casing the small easily controlled amount necessary to bring the casing up to the desired stuffed size.

The invention accordingly comprises the several steps and relation of one or more of such steps with respect to each of the others, which are exemplified in the following detailed disclosure, and the scope of the invention will be indicated in the claims.

The film-forming organic plastic materials as a group may be employed in making the tubing used in the present invention, and the following examples are given only by way of illustrating some members of this group which have been found most suitable: hydrophilic colloids such as cellulose hydrate, alkali-soluble cellulose ethers, gelatine, casein and the like; also synthetic resins, cellulose ethers, cellulose esters, cellulose etheresters, cellulose mixed esters, and the like, and mixtures of these substances. The cellulose hydrate can be produced by regeneration from viscose, by the de-esterification of cellulose esters or by coagulation of cellulose from its solutions in organic and inorganic solvents such for example as tetra-alkyl ammonium hydroxides, zinc chloride, alkali metal perchlorates, sulfuric acid and the like. Because of its superior strength, there is preferably employed tubing comprising cellulose hydrate obtained by the denitration of nitrocellulose, the expansion treatment hereinafter described being carried out after the denitration of the tubing and while it is in a wet state. When the tubing is made from viscose the expansion thereof, according to this invention, is carried out after the regeneration of the cellulose hydrate, but while it is in a wet state.

It is to be understood that all expansion of the casing according to the present invention is independent of and distinct from any stretching to which the casing may have been subjected prior to denitration or prior to regeneration, as the case may be, for example, as disclosed in U. S. Patent No. 2,176,925. Any stretching of the tubing which is carried out before denitration or regeneration does not accomplish the novel results produced by expanding the casing after denitration or regeneration in accordance with the present invention.

The tubing which is to be expanded in accordance with the present invention may be produced in any well known manner, but preferably the tubing to be expanded by the present invention is produced according to said U. S. Patent No. 2,176,925.

One form of apparatus capable of use in carrying out the process of the present invention is diagrammatically illustrated by the drawing. The tubing 4, while in a wet state, passes between a pair of positively driven pinch rollers 6 which are urged toward each other under suitable adjustable pressure exerted by a suitable mechanism actuated by weighted levers, springs or the like in a well known manner sufficiently to seal the tubing passing therethrough. The tubing 4 after leaving the pinch rollers 6 is passed between a second pair of positively driven pinch rollers 8 spaced some distance, for example, 4 to 8 feet from the rollers 6—6, the rollers 8 being also urged together under a suitable pressure in the same or similar manner as the pinch rollers 6—6 so as to seal the tubing passing therethrough. The pinch rollers 8—8 are provided with a suitable separating mechanism (not shown) of any well known type so as to permit the insertion of a hose, nozzle or the like in the open end of the casing to fill and expand that portion of the casing which extends between the pinch rollers 6—6 and 8—8 with a body of fluid such as liquid or gas. By wrapping the open end of the casing about the nozzle and holding it tightly, the operator can impose the desired pressure on the body of fluid to expand the casing to the desired diameter. When the casing has attained the desired enlarged diameter, the operator lowers the upper pinch roller 8 into contact with the casing so as to pinch the casing between the rollers and seal it against leakage of the fluid and thereafter withdraws the nozzle from the casing. This leaves the body of fluid within the casing between the pinch rollers 6—6 and 8—8 to stretch the casing between these rollers as illustrated at 9.

A body of gas, or liquid, or a solid mandrel may be used as the expanding medium but a liquid is in many respects preferable. A liquid which has been found to be particularly desirable for expanding the casing is an aqueous solution of a softening agent for the casing material. The casing is expanded to a predetermined diameter which preferably is in excess of the diameter to which the casing will be expanded during stuffing. The predetermined diameter is ascertained by trial and a diameter is selected such that the casing, after drying and rewetting, will have a circumference smaller than the circumference to which it will be stuffed. The difference between the rewet circumference and the circumference immediately after stuffing is made as small as possible, having regard for the wall thickness of the casing and the physical characteristics of the material from which it is formed, so as to require a minimum stuffing pressure and at the same time cause the elastic forces exerted by the casing during stuffing to be sufficient to hold the product within the casing in a compact, shapely mass which is free from bulges such as would occur if the casing were not expanded at all during stuffing. An expansion to a diameter of between 5 and 40 per cent greater than the diameter after stuffing has been found to be satisfactory.

To support the weight of the liquid, a belt 10 is positioned under the casing and is passed over rollers 12 and 14 which are positively driven so that the belt has the same peripheral speed as the casing. A tank 16 may be provided beneath the belt 10 to receive water discharged from the casing 4 in the event of a break in the casing.

It is to be understood that the invention is not limited to stretching the tubing while it travels in a horizontal plane for the tubing may be stretched while it is moving upwards or downwards. For example, the stretching apparatus disclosed in United States application Serial No. 191,414, filed February 19, 1938, may be used in practicing the process of the present invention. In said prior application there is disclosed means for stretching organic plastic tubing while in the wet gel state comprising, in particular, means for maintaining a pressure differential between the inside and outside of a portion of the tubing while it is travelling continuously through the stretching zone. The pressure differential may be effected by the use of vacuum outside the tubing and/or fluid pressure within the tubing, or by the use of a greater fluid pressure inside, as compared to a fluid pressure outside. Transverse stretching is more uniformly accomplished by exerting a fluid pressure within the tubing, as by the use of air or other gas, but preferably a liquid is employed which is a non-solvent of the tubing material. The tubing may be stretched transversely also by an internally applied mechanical pressure, as by means of a solid mandrel.

The expanded tubing may be dried in any suitable drier while avoiding wrinkling and distortion in general. For example, the casing may be dried by passing it in a sinuous path over and under a plurality of heated rollers of the type used in drying Cellophane, or preferably a drum drier of the type described in United States Patent No. 2,070,252, to Borner, but preferably having larger drying drums than those shown in said patent. At the point A, the casing may be plasticized, spliced or otherwise treated before being dried.

From the pinch rollers 8—8, the stretched wet casing is passed under a suitable guide roller 18 and is passed through an opening into a drier chamber 20 and then passed as many times as desired around positively driven relatively large drier drums 22 and 24 which are driven at substantially the same peripheral speed as the pinch rollers 8—8. The drums 22 and 24 may comprise suitable wheel-like supports 28 which carry axially extending members 30 which may be slats formed of some suitable material such as wood, and may be placed any desired distance apart on the supports 28. A suitable heated gas such as hot air is passed into the drier chamber 20 from any desired source by a conduit 32 and is discharged from the housing by conduit 34 which either returns it for reheating or exhausts it to the atmosphere. The dried casing 4 is then passed out of the housing 20 through a suitable opening and is either wound up on a suitably driven reel, drum or the like 26 or cut to desired lengths and stacked. The various driven members of the machine are driven in any desired manner from any one or more suitable prime movers.

The length of the run of the casing 4 through the drier chamber is made of sufficient length, and the temperature of the drying medium within the chamber is made sufficiently high, for example, 160° F., to dry the casing 4 to any desired amount. The amount of moisture allowed to remain in the dry casing will vary with different climatic conditions and different types of material but for most purposes the casing will be found to be satisfactory if dried to between 6 and 10 per cent moisture content. The casing shrinks during the drying step but to some extent the shrinkage transversely is reduced by the fact that it is supported over a substantial part of its run by surface contact with the drier drums.

By making a preliminary test of the percentage of shrinkage of the normal casing upon drying while unrestrained, the amount of pre-expansion can be varied to compensate for any part or all of the subsequent shrinkage in the drier or to cause the casing to have a larger diameter after drying than before expansion.

The amount which the casing shrinks transversely during drying is of no particular significance since the dry size of the casing is not determinative of the finished size of the stuffed product in view of the fact that the casing is invariably wet and stuffed under pressure. The casing may be dyed, printed or otherwise suitably marked with any desired indicia and/or configurations either before, during or after the expanding step and may be printed after drying.

When the casing is dried flat and there is a tendency for the walls of the casing to adhere, due possibly to lack of air within the casing, this condition can be overcome by passing the casing, preferably after it leaves the dryer chamber 20, between two pairs of pinch rollers similar to rollers 6—6 and 8—8 and trapping a body within the casing between the pinch rollers to cause a separation of the tubing walls. A solid body such as a mandrel, a liquid body such as mercury, or a gas such as air may be used in this manner. A body of air of sufficient volume to merely pull the walls apart is preferred for this purpose, and when the walls have been once separated in this manner there is no tendency for them to again stick together after reeling.

The apparatus used to carry out the process of the present invention may take many different forms and it is to be understood that the apparatus diagrammatically illustrated is for the purpose of explanation only and is not limitative.

The tubing may be plasticized or softened before, during or after expansion but before drying. It is preferred to expand the casing while in a wet state but before plasticizing, since by deferring the plasticizing step until after the expanding step, the loss of plasticizer is avoided in the event that the tubing breaks while expanding and, therefore, while being tested. Also, the thinner wall of the expanded tubing facilitates the plasticizing step in that less time is required for the plasticizer to penetrate entirely through the walls of the tubing. Any plasticizer or softener agent appropriate to the nature of the tubing material may be used. For example, with cellulose hydrate tubing, the plasticizer may be an aqueous solution of glycerine, a glycol, sorbitol, or the like. The tubing may be plasticized by passing it in a flat condition through a tank containing the plasticizing solution. For example, as by festooning it over a plurality of rolls so that at least the lower portions of the loops of the tubing pass into the plasticizing solution; or the tubing may have a plasticizing solution included on the interior of the tubing as well as on the exterior, or the plasticizing solution may be restricted to the interior of the tubing only so as to avoid the formation of deposits of excess plasticizer on the exterior of the tubing and place the majority of the plasticizer on the interior of the tubing where it facilitates stuffing and later removal of the casing from the stuffed product. The absence of free glycerine deposits on the external surface permits printing inks to spread uniformly and adhere tenaciously to the surface.

When the casings are received by the packer they are usually tied at one end and then soaked in water or some liquid which swells the casing material. The open end of the wet casing is slipped or shirred over the stuffing horn of any desired type of stuffing machine. While the casing is so held tightly about the horn by one hand of the operator, the latter operates a pedal or the like to release the product to be filled into the casing from the stuffing machine. The product, such as sausage meat, is ejected from the machine under pressure and is forced into the casing to fill the same and to expand the casing the small amount only which is necessary to insure that the casing closely conforms to the product introduced into the casing without wrinkles or bulges. When the end of the casing is reached, the operator stops the flow of the sausage meat from the stuffer and twists the casing to close the open end. While holding the twisted end of the casing, the operator then ties the twisted end or clips it in accordance with usual procedure to close the casing. The stuffed food product is then passed for further smoking and curing operations in accordance with well known prior art practices.

The small amount which it is necessary for the sausage meat to expand the casing in accordance with the present invention relieves the operator of the effort heretofore required to hold the casing against a high pressure. For example, while stuffing prior art casings, it has frequently been necessary to expand the casing in excess of 40 per cent. During stuffing of the casing in the present invention an expansion of 10 to 18 per cent is all that is required to maintain the casing in tight contact with the casing filling at all times. For the purpose of illustrating the difference between the stuffing procedure required to stuff prior art casings and the casings of the present invention, reference is made to the following table in which the first circumference given for each casing is the circumference obtained after soaking the dried casing in water. Each of the casings measured 10¼ inches in circumference when in the wet, plasticized condition prior to drying and were dried in a flat uninflated condition.

*Circumference in inches during stuffing*

|  | 10¼ | 11 | 11½ | 12 | 12½ | 13 | 13½ | 14 | 14½ |
|---|---|---|---|---|---|---|---|---|---|
| Pressure (pounds) required to expand prior type casing | | | ⅝ | ¾ | 1 | 1⅜ | 1¾ | 2 | 2⅜ | 2¼ |
| Pressure (pounds) required to expand casing of this invention | | | | | | | ½ | ⅝ | ¾ | ⅞ |

The casing from which the above data was obtained was expanded by the internal pressure exerting liquid 60 per cent or to a circumference of 16¼ inches. This high degree of expansion severely tested the casing for the existence of weak spots, pin-holes, etc. The casing was then dried and in drying shrank to a circumference of 10½ inches. The casing was then soaked in water, as a packer would do, whereupon the casing swelled to a circumference of approximately 12½ inches. It was then stuffed and the pressure required to expand the casing to the desired circumferential size for the stuffed product of 14½ inches was only ⅞ of a pound as against 2¼ pounds for the prior type casing. This light pressure expanded the casing of the invention 16 per cent which brought the casing up to the required size; whereas, an expansion of 38 per cent was required to bring the prior type casing up to the desired stuffed size. Even with this slight expansion the shrinkage characteristics of the casing of the invention were substantially preserved as evidenced by the following table:

*Per cent shrinkage after stuffing (wet to air-dry state)*

|  | Shrinkage | |
|---|---|---|
|  | Trans. | Long. |
| Prior type casing | 33.6 | 6.4 |
| Casing of present invention | 32.7 | 8.6 |

The amount of expansion required during stuffing of the casing of the present invention does not require the exercise of skill formerly required to stuff casings in order to produce a casing having a given uniform size throughout its length. Furthermore, the low stuffing pressure required increases the life of the operating parts of the stuffing machine. Also, the low stuffing pressure involved in the use of the casing of the present invention relieves the stuffing machine operator of the necessity for holding the casing against a comparatively high pressure and reduces fatigue on the part of the operator, and thus enables the operator to produce more stuffed products in the course of a working day than was possible heretofore.

If desired, the casing may be stuffed following the expanding operation without drying the casing. The casing stuffed at this time may be plasticized before stuffing or the plasticizer may be omitted if not desired.

One of the outstanding contributions to the art offered by the casing of the present invention is the freedom of the casing from failures during stuffing. In this invention the casings are preferably expanded in the wet state well beyond the diameter to which they will be later expanded during stuffing, therefore any weaknesses, pinholes or other defects within the casing will show up during the expanding operation and any breaks will occur at that time, thus insuring that all casings which successfully pass the present prestretching operation without failure will withstand the low stuffing pressure encountered unless they are damaged subsequently to testing. The pre-tested casing of the present invention reduces the waste of the food product which formerly occurred due to casing failures.

The casing of the present invention expands the small amount required during stuffing under a very low pressure and for this reason the casing wall near the ends of the casing expands abruptly from the tied portion instead of gradually as was the case heretofore and in this manner forms a square ended stuffed product which is much desired by merchants and customers.

The casing of the present invention also simplifies stuffing operations to a point where a relatively unskilled operator may be used, which, of course, further reduces the expense of producing stuffed food products. Also the square end on the stuffed food product reduces loss during slicing because the size of the butt end frequently cut off and discarded is reduced. Furthermore, the pre-expanded casing of the present invention has a relatively thin wall which causes the casing to be soft and thereby capable of being tied rapidly and neatly.

The expression "pre-expanded casing" or "pre-expanded tubing" as used in the appended claims is intended to designate a casing or tubing which has been expanded after denitration or regeneration and while in the wet state to a diameter at least equal to or greater than the diameter to which the casing will be expanded during stuffing.

The casing of the invention may be used for all varieties of stuffed products and while particular reference has been made to its use as a casing for sausage, it may also be stuffed with other food products such as ham butts, boned meat, fowl, cheese, ice cream and the like, and for products which are not foods such, for example, as lubricating grease, snuff, and paste of all kinds.

Since certain changes in carrying out the above process which embodies the invention may be made without departing from its scope, it is intended that all matter contained in the above description or shown in the accompanying drawing shall be interpreted as illustrative and not in a limiting sense.

The invention having been described, what is claimed is:

1. In a process of forming a casing for stuffed products, the steps comprising forming a casing of a film-forming organic plastic material, and expanding said casing during manufacture and prior to the initial drying to an amount at least equal to that to which the casing will be expanded later during stuffing.

2. In a process of forming a casing for stuffed products, the step comprising expanding during manufacture and prior to the initial drying a casing formed of a film-forming organic plastic material while in a wet gel state to an amount greater than that to which the casing will be expanded during stuffing.

3. In a process of forming a casing for stuffed products, the step comprising expanding during manufacture and prior to the initial drying a casing formed of a non-fibrous cellulosic material while in a wet gel state to an amount at least equal to that to which the casing will be expanded later during stuffing.

4. In a process of forming a casing for stuffed products, the steps comprising forming a regenerated cellulose casing from viscose, expanding said casing after regeneration and while in a wet gel state prior to the initial drying to a diameter at least equal to that to which the casing will be expanded later during stuffing, and drying said casing.

5. In a process of forming a casing for stuffed products, the steps comprising forming a casing from nitrocellulose, denitrating said casing, expanding the casing after denitration and while the casing is in a wet gel state prior to the initial drying to an amount at least equal to that to which the casing will be expanded later during stuffing, and drying said casing.

6. In a process for forming a casing for stuffed products, the steps comprising forming a casing from nitrocellulose, denitrating said casing, expanding the casing while in the wet gel state prior to the initial drying by the application of internal hydraulic pressure to a diameter at least equal to that to which the casing will be expanded later during stuffing, plasticizing the casing, and drying said casing.

7. In a process for producing a stuffed food product, the steps comprising expanding during manufacture and prior to the initial drying a casing formed of a film-forming organic plastic material while in a wet gel state to an amount at least equal to that to which the casing will be expanded later during stuffing, drying said casing and stuffing a food product into said casing.

8. In a process for producing stuffed sausage, the steps comprising expanding a casing formed of a film-forming organic plastic material while in a wet gel state prior to the initial drying to an amount greater than that to which said casing will be expanded later during stuffing, drying said casing and stuffing sausage into said casing.

9. In a process for producing a stuffed sausage having a desired stuffed diameter, the steps comprising expanding a casing formed of a film-forming organic plastic material while in a wet gel state prior to the initial drying to a diameter at least equal to said stuffed diameter, drying said casing and stuffing said casing with sausage meat to said desired diameter.

10. In a process for producing stuffed sausage, the steps comprising expanding a casing formed of a film-forming organic plastic material while in a wet gel state prior to the initial drying to a predetermined diameter, drying the casing and stuffing said casing with sausage meat to a diameter less than said predetermined diameter.

11. In a process for producing a stuffed food product, the steps comprising forming a tubing from a convertible non-fibrous film-forming material, converting the material of the tubing, expanding the converted tubing while in a wet gel state prior to the initial drying to an amount greater than that to which the tubing will be expanded later during stuffing to test the tubing, drying said tubing and stuffing the tubing with the desired food product while expanding the tubing an amount less than that to which the tubing was previously expanded.

12. In a process for producing a stuffed food product, the steps comprising expanding a casing formed of a film-forming organic plastic material while in a wet state prior to the initial drying to a diameter greater than that to which the casing will be expanded later during stuffing, drying the casing, wetting the dried casing and stuffing a food product into said wet casing until the casing has a diameter less than that to which the casing was pre-expanded during manufacture.

FRANK H. REICHEL.
AUGUSTUS E. CRAVER.